(12) United States Patent
Alliss (10) Patent No.: US 8,745,879 B2
(45) Date of Patent: Jun. 10, 2014

(54) STRING TRIMMER HEAD CONFIGURATION AND METHOD

(76) Inventor: George E. Alliss, Bladenboro, NC (US)

( * ) Notice: Subject to any disclaimer, the term of this patent is extended or adjusted under 35 U.S.C. 154(b) by 125 days.

(21) Appl. No.: 13/149,867

(22) Filed: May 31, 2011

(65) Prior Publication Data

US 2011/0225832 A1    Sep. 22, 2011

Related U.S. Application Data

(63) Continuation-in-part of application No. 12/428,453, filed on Apr. 22, 2009.

(60) Provisional application No. 61/071,321, filed on Apr. 22, 2008.

(51) Int. Cl.
*A01G 3/06*    (2006.01)

(52) U.S. Cl.
USPC .................................. 30/276; 30/347; 56/295

(58) Field of Classification Search
USPC .......... 30/276, 272.1, 347, 285; 56/12.7, 295; 242/597.4
See application file for complete search history.

(56) References Cited

U.S. PATENT DOCUMENTS

| | | | | |
|---|---|---|---|---|
| 4,203,212 A * | 5/1980 | Proulx | ............................. | 30/276 |
| 4,259,782 A * | 4/1981 | Proulx | ............................. | 30/276 |
| 4,633,588 A * | 1/1987 | Pittinger, Jr. | ................... | 30/347 |
| 4,672,798 A * | 6/1987 | Ota | ................................. | 56/12.7 |
| 5,060,384 A | 10/1991 | Everts | | |
| 5,109,607 A | 5/1992 | Everts | | |
| 5,765,287 A * | 6/1998 | Griffini et al. | ................... | 30/276 |
| 5,881,464 A | 3/1999 | Collins et al. | | |
| 7,017,272 B2 * | 3/2006 | Grace | ........................ | 30/275.4 |
| 7,581,322 B2 * | 9/2009 | Proulx | ............................. | 30/276 |
| 7,607,232 B2 * | 10/2009 | Pfaltzgraff | ...................... | 30/276 |
| 7,640,668 B2 * | 1/2010 | Iacona | ............................ | 30/276 |
| 7,797,839 B2 * | 9/2010 | Proulx | ............................. | 30/276 |
| 7,882,642 B2 * | 2/2011 | Proulx | ............................. | 30/276 |
| 7,979,991 B2 * | 7/2011 | Pfaltzgraff | ...................... | 30/276 |

* cited by examiner

*Primary Examiner* — Omar Flores Sanchez

(74) *Attorney, Agent, or Firm* — Merek, Blackmon & Voorhees, LLC (57) ABSTRACT

A trimmer head assembly and the method of configuring the trimmer head assembly. The trimmer head assembly has a housing that attaches to a string trimmer machine. A spool is provided inside the housing. The spool rotates about an axis of rotation. The spool can move longitudinally along the axis of rotation between a first position and a second position. A ratcheting mechanism is provided between the trimmer head housing and the spool. When the spool is in its first position, the ratcheting mechanism enables the spool to continuously rotate about the axis of rotation in the direction opposite that in which the trimmer head assembly spins. The ratchet mechanism also prevents the spool from rotating within the housing in the same direction in which the trimmer head is spinning.

18 Claims, 7 Drawing Sheets

STRING TRIMMER HEAD CONFIGURATION AND METHOD

RELATED APPLICATIONS

The present invention is a continuation-in-part of U.S. patent application Ser. No. 12/428,453, entitled, String Trimmer Head Configuration and Method, filed Apr. 22, 2009, which claims priority of provisional patent application No. 61/071,321, entitled, Combination Line Feed and Ratcheting Mechanism for Semi-Automatic Spool Trimmer Heads, filed Apr. 22, 2008.

BACKGROUND OF THE INVENTION

1. Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2. Prior Art Description

String trimmer machines have been commercially sold for over a quarter of a century. In this period of time, there have been many variations to the design of the string trimmer machine and especially to the trimmer head.

The trimmer head is the part of the string trimmer machine that rotates. The trimmer head holds lengths of trimmer line that rotate with the trimmer head. The rotating trimmer line contacts and cuts vegetation as it spins.

Depending upon the make, model, and manufacturer of the string trimmer machine, the trimmer head rotates either clockwise or counterclockwise during operation. The mix in the current retail market is evenly split between clockwise and counterclockwise rotating string trimmer machines.

There are many types of trimmer heads on the market. The most common types of trimmer heads are the bump-feed trimmer head and the automatic-feed trimmer head. Both types of trimmer heads contain an internal spool that holds a reserve of wound trimmer line. As the trimmer line wears away, it can be replaced from the internal spool. In a bump-feed trimmer head, a short length of line is released from the spool when the bottom of the trimmer head is impacted or "bumped" against a hard surface. In an automatic-feed trimmer head, a short length of line is released from the spool when a predetermined change in centrifugal forces occurs that indicates that the existing trimmer line has become too short. Many mechanisms exist in the prior art for controlling the release of wound trimmer line from the internal spool of a trimmer head. Bump-activated trimmer heads are exemplified by U.S. Pat. No. 5,881,464 to Collins, entitled Line Head For Flexible Line Trimmer. Automatic-feed trimmer heads are exemplified by U.S. Pat. No. 5,060,384 to Everts, entitled Automatic Head For A Line Trimmer; and U.S. Pat. No. 5,109,607 to Everts, entitled Automatic Line Trimmer Head.

Many problems exist with traditional trimmer head designs. Primary among those problems are problems concerning the twisting of string on the spool. Most trimmer heads contain two separate lengths of trimmer line. A trimmer head relies upon centrifugal force to pull the trimmer lines from the spool. If the trimmer lines tangle, twist, or become buried under subsequent windings, the trimmer lines will not dispense in the proper manner. The trimmer head must then be disassembled, the trimmer string unwound and again rewound in the proper manner before the trimmer head will again work as designed. Furthermore, whenever the trimmer string supply is exhausted, the trimmer head must be manually disassembled. The spool is removed and rewound with a new supply of trimmer line. The spool is then reassembled back into the trimmer head. This process is difficult, labor intensive and highly time consuming. Furthermore, the entire process is often too difficult for many homeowners to complete successfully or even attempt.

Another problem associated with traditional feed trimmer heads is the complexity and reliability of the release mechanism that draws trimmer line from the spool when needed. As many homeowners will attest, the mechanism for releasing the trimmer line is usually the first part of a string trimmer machine that fails to work. Once the release mechanism fails, the trimmer line must be periodically pulled out of the trimmer head using the operator's hands. This is both a time consuming and dangerous operation.

Yet another disadvantage of traditional trimmer heads is that the trimmer head is designed to rotate in only a single direction. Accordingly, a trimmer head designed for a clockwise trimmer will not work on a counterclockwise trimmer. Furthermore, the parts from a clockwise trimmer head cannot be interchanged with any of the parts from a counterclockwise trimmer head. This requires a trimmer head manufacturer to create two sets of manufacturing tools, one for clockwise trimmer heads and one for counterclockwise trimmer heads. This significantly increases the cost associated with manufacturing trimmer heads. Furthermore, it results in each trimmer head design having two different models, one for clockwise rotation, and one for counterclockwise rotation. This significantly increases the odds that a consumer will purchase the wrong type of trimmer head for his/her string trimmer machine when looking for a replacement.

A need therefore exists for a string trimmer head that has an inexpensive yet reliable mechanism for dispensing trimmer line when needed. A need also exists for a string trimmer head that dispenses trimmer line without the trimmer line tangling, twisting, or binding. Furthermore, a need exists for a trimmer head that does not have to be disassembled to have new string added. Lastly, a need exists for a trimmer head that can be manufactured inexpensively and in a manner where many of the parts from a clockwise trimmer head are identical to parts in a counterclockwise trimmer head. These needs are met by the present invention as described and claimed below.

SUMMARY OF THE INVENTION

The present invention is a trimmer head assembly and the method of configuring the trimmer head assembly. The trimmer head assembly attaches to a string trimming machine. The trimmer head assembly holds lengths of trimmer line that cut vegetation when the trimmer head assembly spins and contacts the vegetation.

The trimmer head assembly has a housing that attaches to the string trimmer machine. A spool is provided inside the housing. The spool rotates about an axis of rotation. The spool can move longitudinally along the axis of rotation between a first position and a second position. A ratcheting mechanism is provided between the trimmer head housing and the spool. When the spool is in its first position, the ratcheting mechanism enables the spool to continuously rotate about the axis of rotation in the direction opposite that in which the trimmer head assembly spins. The ratchet mechanism also prevents the spool from rotating within the housing in the same direction in which the trimmer head is spinning.

Using the ratcheting mechanism, new trimmer line can be wound onto the spool, simply by attaching the trimmer line to the spool and manually turning the spool. No disassembly is required.

In operation, a mechanism is provided for momentarily moving the spool from its first position in the housing to its second position. The mechanism can be automatic or bump activated. Once momentarily in its second position, the ratchet mechanism releases and the spool can turn and enable a small length of the trimmer line to unwind from the spool.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention trimmer head can be embodied in many ways, only one exemplary embodiment is illustrated. This embodiment is selected in order to set forth one of the best mode contemplated for the invention. The illustrated embodiment, however, is merely exemplary and should not be considered a limitation when interpreting the scope of the appended claims.

Figure 1:
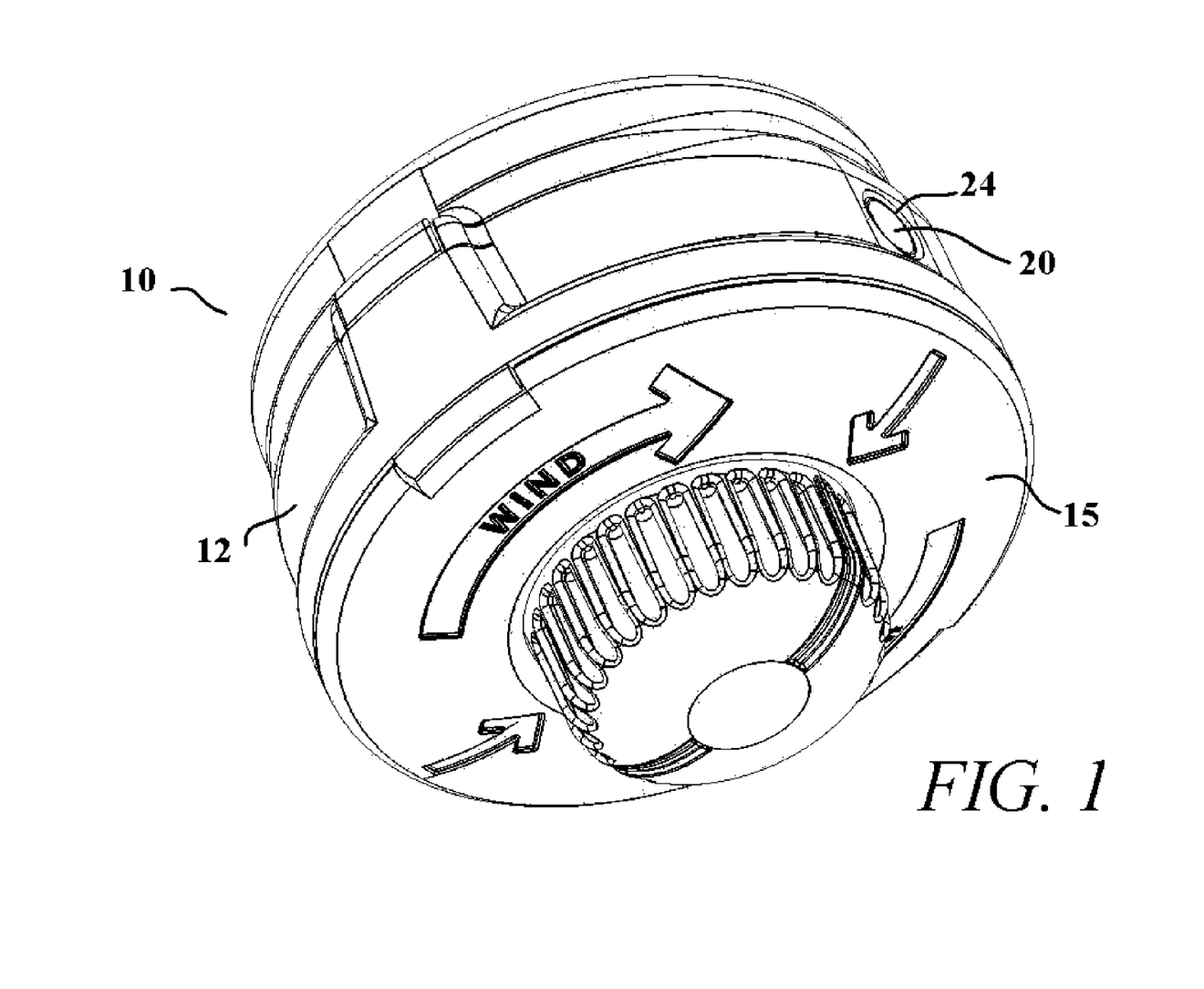
FIG. 1 is a perspective view of an exemplary embodiment of a trimmer head assembly.
Figure 2:
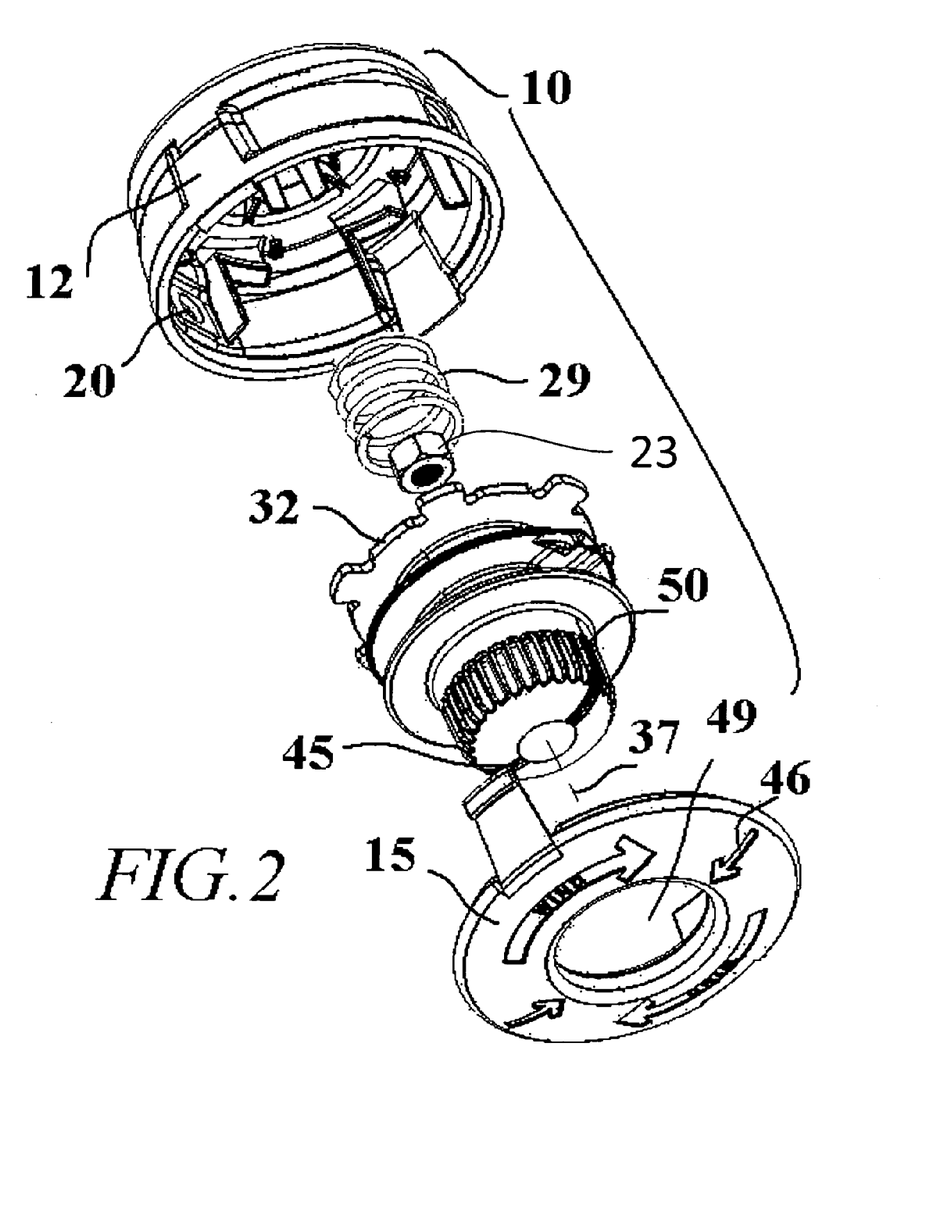
FIG. 2 is an exploded view of the embodiment of FIG. 1.

Referring to FIG. 1 and FIG. 2, a first exemplary trimmer head assembly 10 is shown. The trimmer head assembly 10 attaches by a respective nut 23 to the drive shaft of a string trimmer machine (not shown), which may rotate the trimmer head assembly 10 either clockwise or counterclockwise depending upon the model of the string trimming machine being used. The trimmer head assembly 10 is comprised of three major molded plastic parts and a metal spring 29. The major plastic molded parts include a primary housing 12, a spool 32 and an end cap 15 that holds the spool 32 within the primary housing 12.

Figure 7:
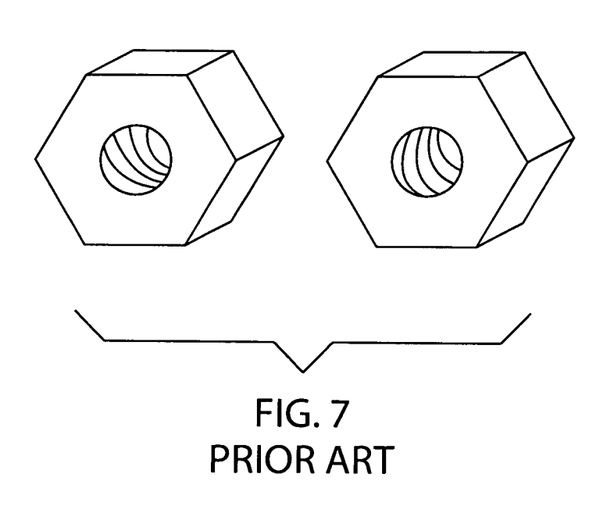
FIG. 7 is a diagrammatic view of two prior art nuts having various threading directions.

As is well known in the art, the direction of threading of the drive shaft of the string trimmer machine will depend on the direction the drive shaft will rotate so that the nut will not unwind during normal operation/rotation of the drive shaft. Therefore, the nut 23 must be selected for proper threading to mate with the respective threading of the string trimmer drive shaft.

Figure 3:
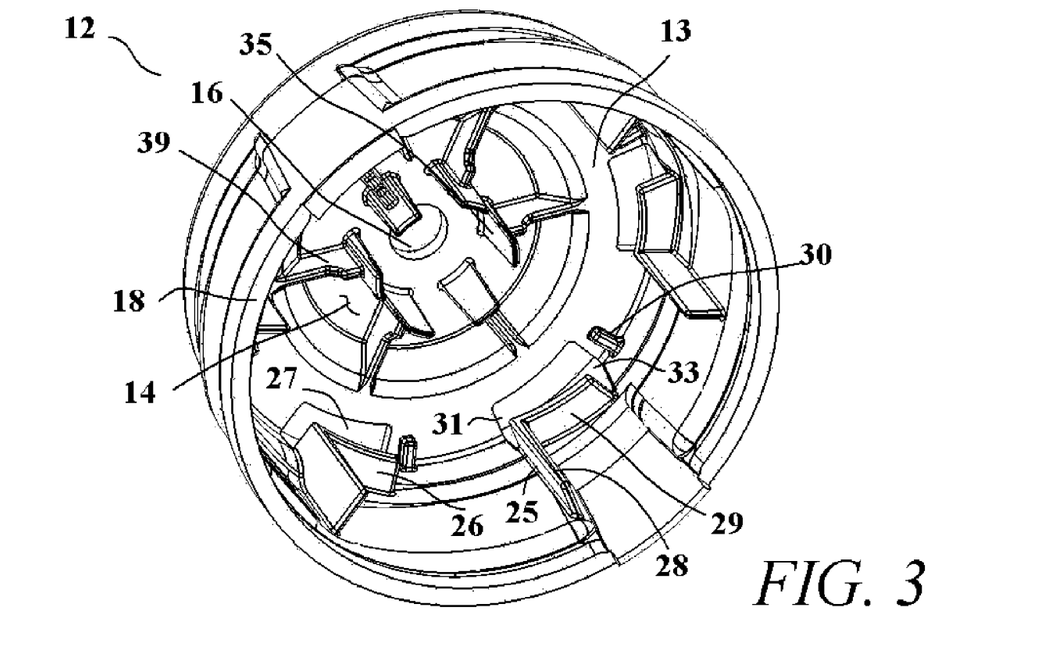
FIG. 3 is an enlarged perspective view of the housing used in the exemplary embodiment.

Referring to FIGS. 1 and 2 now in conjunction with FIG. 3, it can be seen that the primary housing 12 defines an open interior 14. The top surface 13 of the housing 12 is closed, except for a mounting hole 16 that permits the passage of the drive shaft into the housing 12. The bottom of the housing 12 is open, therein providing easy access to the open interior 14 of the housing 12. The periphery of the open interior 14 of the housing 12 is defined by a cylindrical wall 18 that extends downwardly from the periphery of the top surface 13.

At least two string ports 20 are formed through the cylindrical wall 18. The string ports 20 are diametrically opposed. If more than two string ports 20 are provided, it will be understood that the various string ports will be symmetrically disposed. The housing 12 may contain thickened regions about each of the string ports 20 to compensate for the wearing of plastic at the string ports 20. Furthermore, optional eyelets 24 may be provided within the string ports 20. The eyelets 24 can be made from metal, ceramic, or a hard plastic that resists contact wear better than does the material of the remainder of the housing 12.

A plurality of spool lifting guides 26 are formed within the open interior 14 of the housing 12. The spool lifting guides 26 are formed along the cylindrical wall 18 just below the top surface 13. Each spool lifting guide 26 is defined by three surfaces that form an open guide channel 27. The rear surface of each spool lifting guide 26 is the cylindrical wall 18 of the housing. The top surface of each spool lifting guide 26 is the top surface 13 of the primary housing 12. The bottom surface of each lifting guide 26 is a sloping ramp structure 25. Each sloped ramp structure 26 includes a vertical segment 28 and a sloped segment 29. The sloped segment 29 is angled relative to the plane of the top surface 13 of a housing 12. The result is that each spool lifting guide 26 has a wide entry opening 33 and a narrower exit opening 31.

A stop projection 30 extends from the top surface 13 of main housing 12 just before the wide entry opening 33 of each spool lifting guide 26. The stop projections 30 are narrower than the wide entry openings 33. Accordingly, the stop projections 30 only obstruct the wide entry openings 33 close to the top surface 13 of the primary housing 12. The purpose of the stop projections 30 and there function with spool lifting guides 26 will be later explained in detail.

Hub projections 35 extend downwardly in a circular pattern from the top surface 13 of the primary housing 12. The hub projections 35 act as an axle. The hub projections 35 enter the spool 32 and enable the spool 32 to spin in place around the hub projections 35. This maintains the spool around a single axis of rotation 37.

The hub projections 35 are supported by ribs 39. The ribs 39 add strength to the hub projections 35. The ribs 39 also act as an end stop that prevents the spool 32 from contacting the top surface 13 of the primary housing 12 when spinning.

Likewise, the vertical sections 28 of each sloped ramp structure 25 are elongated and act as guides to the spool 32. The vertical sections 28 stabilize the spool 32 and prevent the spool 32 from wobbling about its axis of rotation 37, especially if the spool 32 is caused to be out of balance by an uneven wound length of trimmer line.

Figure 4:
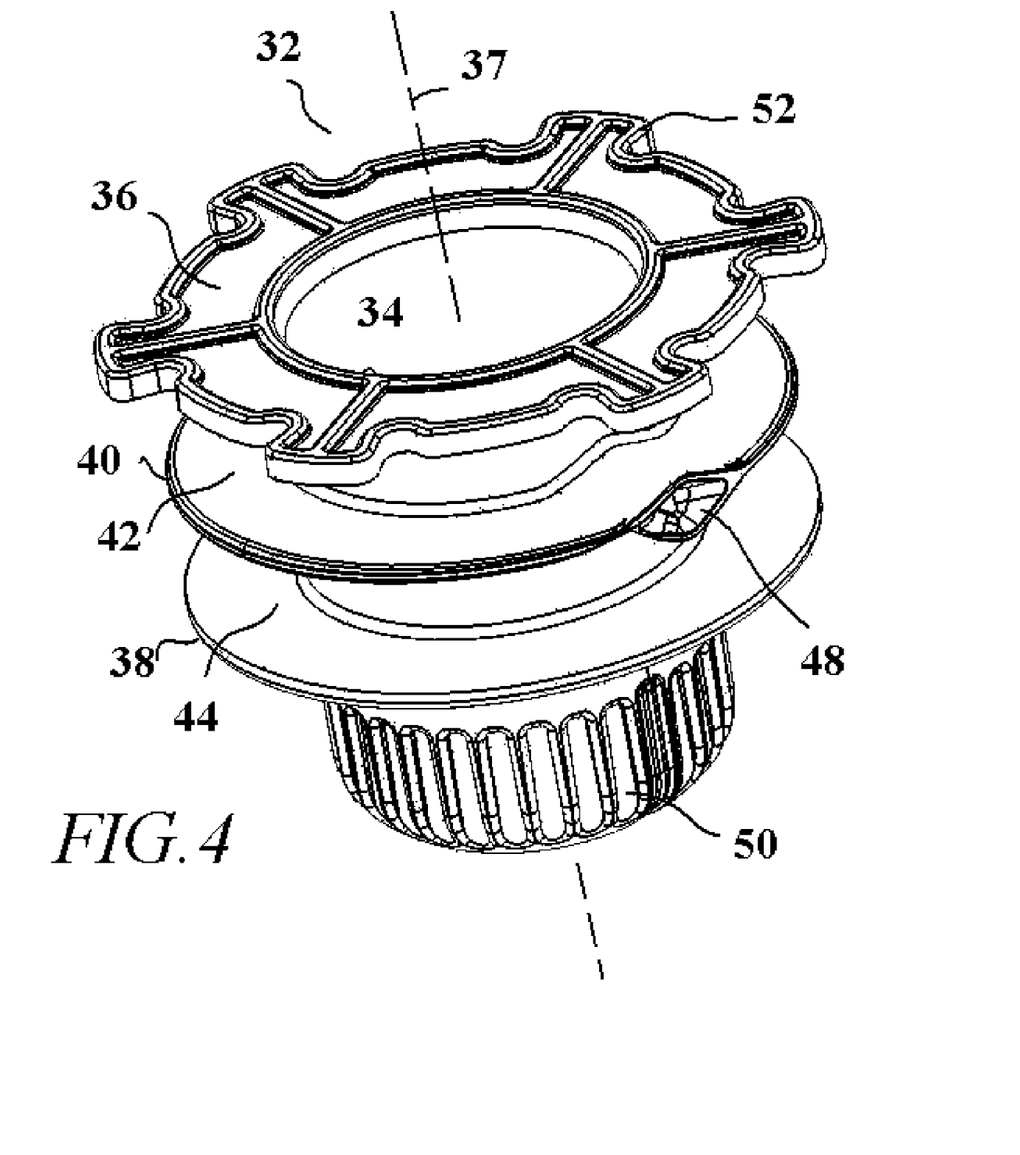
FIG. 4 is a reverse perspective view of a spool used in the exemplary embodiment.

Referring now to FIG. 1 and FIG. 2 in conjunction with FIG. 4, it can be seen that a complex spool 32 is held within the open interior 14 of the housing 12. The spool 32 rotates about an imaginary axis of rotation 37. The spool 32 has a cylindrical hub 34 that supports a top flange 36, a bottom flange 38, and a central flange 40. Accordingly, the spool 32 contains two separate winding chambers 42, 44 where lengths of trimmer line can wind around the cylindrical hub 34. An upper winding chamber 42 is disposed between the top flange 36 and the central flange 40. A lower winding chamber 44 is disposed between the central flange 40 and the bottom flange 38.

Two line-feed conduits 48 extend into the central flange 40. One anchor conduit 48, shown in FIG. 4, has a side relief that leads into the lower winding chamber 44. The opposite line-feed conduit, not shown side relief that leads into the lower winding chamber 44. The line-feed conduits 48 are used to receive and engage the ends of two lengths of trimmer line. In this manner, when the spool 32 is rotated, the two lengths of trimmer line will either separately wind onto, or unwind from, the upper and lower winding chambers 42, 44, respectively.

The top flange 36 on the spool 32 is generally configured as a cogwheel. Cog projections 52 radially extend from the top flange 36 at symmetrical points. The number of cog projections 52 on the top flange 36 is equal to the number of spool lifting guide projections 26 within the primary housing 12.

A bump knob 50 extends below the bottom flange 38 of the spool 32 to facilitate the manual engagement and turning of the spool 32. The bump knob is thickly molded to enable the bump knob 50 to take many impacts against hard surfaces without breaking.

Referring back to FIG. 2, it will be seen that the spool 32 is affixed to the drive shaft of the string trimmer machine by a mounting bolt 58. A spring 29 is provided between the spool 32 and the top surface 13 of housing 12. The spring 29 biases the spool 32 downwardly away from the top surface 13 of the housing 12. To help prevent the spring 29 from wearing against the spool 32, an optional wear plate (not shown) can be provided between the spool 32 and the spring 29.

The end cap 15 connects to the primary housing 12 and spins with the primary housing 12. The end cap 15 defines a large central opening 49, though which the bump knob 50 extends outside of the primary housing 12. The end cap 15 has orientation markings 46 that align with orientation markings 45 on the bump knob 50. When aligned, this informs a user that the spool 32 is properly aligned with the trimmer line openings 20 in the housing 20 to receive new trimmer line.

Figure 5:
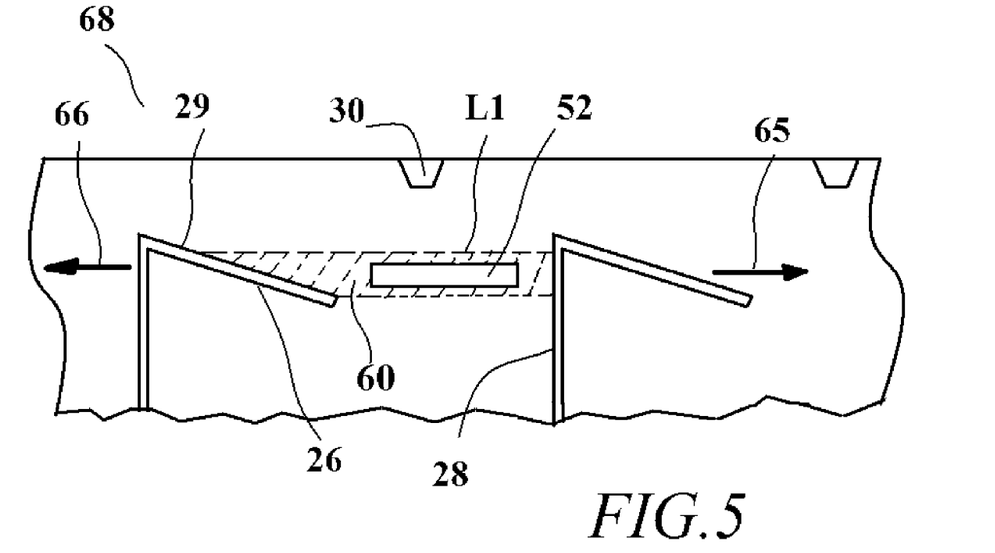
FIG. 5 is a schematic showing the relative operation of a ratcheting mechanism during a winding process.

Referring now to FIG. 5 in conjunction with FIGS. 2, 3 and 4, it will be understood that when the trimmer head assembly 10 is fully assembled, the cog projections 52 on the top flange 36 of the spool 32 rest within predefined operational areas 60 within the primary housing 12. The width of each operational area 60 is the distance between the sloped surface 29 of one spool lifting guide 26 and the vertical section 28 of the nearest adjacent spool lifting guide 26. The height of the operational area 60 begins at the start of the sloped surface 29 and continues to a spring bias line L1. The spring bias line L1 is a distance below the stop projections 30 and corresponds to a point where the spring 29 biases the cog projections 52 and spool 32 in place absent any other applied forces. It will be understood that when the cog projections 52 are in their operational areas 60, the movement of the cog projections 52 is restricted. The cog projections 52 are prevented from moving upwardly by the bias of the spring 29. If the spool 32 is turned in the direction of arrow 65, the cog projections 52 contact the vertical segment 28 of one spool lifting guide 26. This contact stops any further rotation of the spool 32 in that direction. When the spool 32 is rotated in the direction of opposite arrow 66, the cog projections 52 contact the sloped segment 29 of the adjacent spool lifting guide 26. Under normal operating conditions, this contact keeps the cog projections 52 in their operational areas 60. However, if the spool 32 is intentional rotated by a user's hand, the cog projections 52 ride up the sloped segment 29 of the spool lifting guide 26. This movement slightly compresses the spring 29. However, the bias of the spring 29 can easily be overcome by the force of a person grasping and turning the spool 32, via the bump knob 50. This raises the entire spool 32 within the housing 12 from an initial first position to a higher second position. Although the resistance increases slightly, a person can continue to rotate the spool in the direction of arrow 66. The interaction of the cog projections 52 and the spool lifting guides 26 creates a ratcheting mechanism 68. The ratcheting mechanism 68 enables the spool 32 to rotate indefinitely in the direction of arrow 66 and prevents rotation in the opposite direction of arrow 65.

In the exemplary embodiment, the direction of arrow 66 corresponds to a counter clockwise rotation of the spool 32. As such, the spool 32 can be manually turned counterclockwise and not clockwise. It will be understood, that by reversing the configuration of the spool lifting guides 26, the spool 32 would be able to be manually rotated clockwise and not counterclockwise without any changes to the spool 32. Accordingly, depending upon the operational direction of spin for the string trimmer machine being used, one of two different housing types must be used. All other elements of the trimmer head assembly can remain the same.

Referring back to FIGS. 1-4, it will be understood that in order to load trimmer line into the trimmer head assembly, either one or two lengths of trimmer line are provided. The spool 32 is manually rotated until the feed-line conduits 48 on the central flange 40 align with the string ports 20 in the housing 12. If one length of trimmer line is provided, the trimmer line is inserted into one string port 20, through the central flange 40 of the spool 32 and out the opposite port. The trimmer line is pulled through the trimmer head assembly 10 until roughly equal amounts of trimmer line are present on either side of the trimmer head assembly 10. The spool 32 is then rotated by grasping and turning the bump knob 50 at the bottom of the spool 32. As the spool 32 rotates, the spool 32 winds half of the trimmer line 45 in the upper winding chamber 42 and the other half of the trimmer line 45 in the lower winding chamber 44. By winding the trimmer line 45 into separate winding chambers 42, 44, all problems associated with line twisting and entanglement are removed.

If two separate lengths of trimmer line are provided, then each length of trimmer line is inserted into a different line-feed conduit and into opposite sides of the central flange 40 of the spool 32. The spool 32 is then rotated by grasping and turning the bump knob 50 at the bottom of the spool 32. As the spool 32 rotates, the spool 32 winds one length of trimmer line into the upper winding chamber 42 and the other length of trimmer line into the lower winding chamber 44. By winding the trimmer lines into separate winding chambers 42, 44 all problems associated with line twisting and entanglement are removed.

Using either one length of line or two lengths of line, it can be seen that the trimmer line can be quickly wound onto the spool 32 without any disassembly of the trimmer head assembly 10. New trimmer line can therefore be added without tools in a simple and easy to understand procedure.

Figure 6:
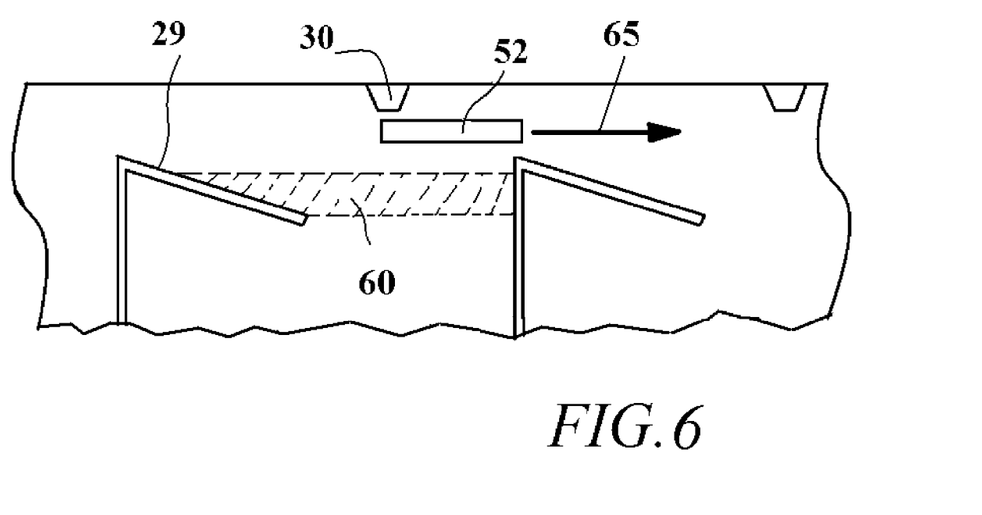
FIG. 6 is a schematic showing the relative operation of a ratcheting mechanism during an unwinding process.

In operation, the trimmer head assembly 10 rotates at high speeds. Eventually, the trimmer lines break or wear away. To advance needed trimmer line off the spool 32, the bump knob 50 is impacted against a hard surface while the trimmer head assembly 10 is spinning. Referring to FIG. 6 in conjunction with FIG. 2, it can be seen that when the bump knob 50 is impacted, the spool 32 is driven up into the housing 12 against the bias of the spring 29. At this momentary second position, the cog projections 52 raise above their normal operational areas 60 and the cog projections 52 are momentarily capable of rotating in the direction of arrow 65. This enables trimmer lines to unwind from the spool 32. Each cog projection 52 is prevented from over rotation by the stop projections 30. The cog projections 52 contact the stop projections 30 and are stopped from rotating further. The bias from the spring 29 then returns the cog projections 52 of the spool 32 to their normal operational areas.

In the embodiment of FIGS. 1-6, the trimmer lines are dispensed from the spool 32 by impacting the bump knob 50 at the bottom of the spool 32. It will be understood, the same functionality of dispensing trimmer line can be engineered into an autofeed trimmer head design. In an autofeed design, the spool rises in the housing when the angular velocity exceeds a predetermined level. Many such designs exist. It will therefore be understood that there are many known mechanisms, both bump feed and autofeed, that can be used to momentarily raise a spool in a trimmer housing when a trimmer line becomes too short. All such variations are capable of being adapted for use as part of the present invention.

It will be further understood that the embodiments of the present invention that are illustrated and described are merely exemplary and that a person skilled in the art can make many variations to those embodiments. For instance, the number of cog projections, spool lifting guides and stop projections can be varied provided the numbers for these elements remain equal. Likewise, the shape of the bump knob, the shape of the housing and the shape of the spool can be varied into numerous configurations that are not illustrated. All such embodiments are intended to be included within the scope of the present invention as defined by the claims.

What is claimed is:

1. A trimmer head assembly for use selectively with either a clockwise trimmer or with a counterclockwise trimmer, the trimmer head comprising:
   a housing having a closed end, an open end and a peripheral wall that extends from said closed end to said open end, wherein said housing defines an interior, and wherein at least two string line openings are disposed in said peripheral wall;
   a nut for attaching said housing to a trimmer wherein said nut is selected from the group of a first nut having threading for respectively mating to a clockwise trimmer and a second nut having threading for respectively mating to a counterclockwise trimmer;
   a spool positioned within said interior of said housing, said spool having cog projections radially extending therefrom;
   a spring disposed between said closed end of said housing and said spool within said interior of said housing, wherein said spring provides a bias force that biases said spool away from said closed end to a first position within said interior;
   a ratcheting mechanism between said housing and said spool;
   said ratcheting mechanism including a plurality of lifting guides disposed in said housing, wherein said cog projections are radially disposed between said lifting guides when said spool is in said first position within said housing;
   a bump knob coupled to said spool, wherein said bump knob extends out of said housing for moving said spool to a second position within said interior when said bump knob is impacted, wherein said cog projections are disposed axially above said lifting guides when said spool is in the second position;
   said lifting guides comprising inclined surfaces for promoting the cogs to contact the lifting guides for moving said spool from the first axial position to the second axial position when sufficient force is applied to the cog to overcome the axial bias force of the spring acting on the spool;
   said ratcheting mechanism further including a plurality of stop projections coupled to said housing within said interior axially offset from said lifting guides, wherein said stop projections contact said cog projections and limit the rotation of said spool in said second direction when said spool is in said second position; and
   wherein the ratcheting mechanism controls relative rotation of the spool to the housing as rotation of said spool relative to said housing in said first position causes said cogs to rotationally pass below said stop projections and strike said lifting guides obstructing further relative rotation to the housing without moving to the second position, and wherein rotation of said spool relative to said housing in said second position causes said cogs to rotationally pass above said lifting guides and strike at least one of said stop projections obstructing further relative rotation to the housing without returning to the first position;
   wherein said trimmer head can operatively selectively attach to both a clockwise trimmer and a counterclockwise trimmer by selecting the respective mating nut from said group of the first nut and the second nut clockwise and bolting the housing to the respective trimmer using the respective nut.

2. The assembly according to claim 1, wherein said ratcheting mechanism enables said spool to rotate in said second direction when said spool is in said second position within said housing.

3. The assembly according to claim 1, wherein each of said lifting guides includes a sloped surface that engages said cog projections and moves said spool from said first position toward said second position when as said spool is rotated in said first direction and said cog projections pass over said lifting guides.

4. The assembly according to claim 1, wherein each of said lifting guides has a vertical segment and a sloped segment.

5. The assembly according to claim 4, wherein said vertical segments of said lifting guides guide said pool and maintain said spool in proper orientation around said axis of rotation.

6. The assembly according to claim 1, wherein said a spool has a top flange, a center flange and a bottom flange, wherein a first winding chamber is defined between said top flange and said central flange, and a second winding chamber is defined between said central flange and said bottom flange.

7. The assembly according to claim 6, wherein said spool includes line-feed conduits disposed in said central flange.

8. The assembly according to claim 6, wherein said cog projections radially extend from said top flange.

9. The trimmer head of claim 1, wherein said ratchet mechanism allows relative motion of the spool with the housing to rotate a cog rotationally past the lifting guide in either a clockwise or counterclockwise direction when the spool is in the second position.

10. A trimmer head assembly for use selectively with a clockwise trimmer having a driveshaft for rotating a trimmer head in a first direction, the trimmer head comprising:
    a housing having a closed end, an open end and a peripheral wall that extends from said closed end to said open end, wherein said housing defines an interior, and wherein at least two string line openings are disposed in said peripheral wall;
    a spool positioned within said interior of said housing, said spool having cog projections radially extending therefrom;
    a spring disposed between said closed end of said housing and said spool within said interior of said housing, wherein said spring provides a bias force that biases said spool away from a second position adjacent said closed end to a first position remote from said closed end and within said interior;
    a ratcheting mechanism between said housing and said spool;
    said ratcheting mechanism including a plurality of lifting guides disposed in said housing, wherein said cog projections are disposed between said lifting guides when said spool is in said first position within said housing; and said lifting guides each comprising an inclined surface relative to the axis of rotation of the spool for moving said spool from the first axial position to the second position when a winding force on said spool in a second direction relative to said housing causes said cog to follow said lifting guide inclined surface to move the spool from the first position to said second position, wherein said second direction is the opposite rotational direction of said first direction.

11. A trimmer head assembly for use selectively with a clockwise trimmer having a driveshaft for rotating a trimmer head in a first direction, the trimmer head comprising:

a housing having a closed end, an open end and a peripheral wall that extends from said closed end to said open end, wherein said housing defines an interior, and wherein at least two string line openings are disposed in said peripheral wall;

a nut for attaching said housing to a trimmer wherein said nut has a threading for respectively mating to a trimmer driving the housing in the first direction;

a spool positioned within said interior of said housing, said spool having cog projections radially extending therefrom;

a spring disposed between said closed end of said housing and said spool within said interior of said housing, wherein said spring provides a bias force that biases said spool away from said closed end to a first position within said interior;

a ratcheting mechanism between said housing and said spool;

said ratcheting mechanism includes a plurality of lifting guides disposed in said housing, wherein said cog projections are disposed between said lifting guides when said spool is in said first position within said housing;

a bump knob coupled to said spool, wherein said bump knob extends out of said housing for moving said spool to a second position within said interior when said bump knob is impacted, wherein said cog projections are disposed axially above said lifting guides when said spool is in the second position;

said lifting guides comprising inclined surfaces to promote cogs contacting the lifting guides to move said spool from the first axial position to the second position when a force is applied to the cog sufficient to overcome the axial bias force of the spring acting on the spool;

said ratcheting mechanism further including a plurality of stop projections coupled to said housing within said interior axially offset from said lifting guides, wherein said stop projections contact said cog projections and limit the rotation of said spool in said second direction when said spool is in the second position.

12. The trimmer head assembly of claim 11, further comprising a bump knob connected to said spool, wherein said bump knob extends out of said housing for moving said spool to the second position within said interior when said bump knob is impacted, wherein said cog projections are disposed axially above said lifting guides when said spool is in the second position.

13. The trimmer head assembly of claim 12, said ratcheting mechanism further including a plurality of stop projections coupled to said housing within said interior axially offset from said lifting guides, wherein said stop projections contact said cog projections and limit the rotation of said spool in said second direction when said spool is in the second position.

14. The trimmer head assembly of claim 13, wherein said first direction is a clockwise direction when viewing said trimmer head assembly from above said trimmer head housing.

15. The trimmer head assembly of claim 13, wherein said first direction is a counterclockwise direction when viewing said trimmer head assembly from above said trimmer head housing.

16. The trimmer head assembly of claim 11, wherein said first direction is a clockwise direction when viewing said trimmer head assembly from above said trimmer head housing.

17. The trimmer head assembly of claim 11, wherein said first direction is a counterclockwise direction when viewing said trimmer head assembly from above said trimmer head housing.

18. The trimmer head assembly of claim 1, wherein said lifting guides and said stop projections are axially offset radially and axially from each other, and the axial distance from the bottom of said stop projections to the top of said lifting guides is at least the axial width of the cogs for forming a circuitous route for said cog to follow as the spool rotates relative to the housing, forcing said cog into said spool first position for said cogs to rotate past said lifting guide and into said spool second position for said cogs to rotate pas said lifting guide.

* * * * *